US007302645B1

(12) United States Patent
Henzinger et al.

(10) Patent No.: US 7,302,645 B1
(45) Date of Patent: Nov. 27, 2007

(54) METHODS AND SYSTEMS FOR IDENTIFYING MANIPULATED ARTICLES

(75) Inventors: Monika Henzinger, Corseaux (CH); Alexander Mark Franz, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 642 days.

(21) Appl. No.: 10/732,048

(22) Filed: Dec. 10, 2003

(51) Int. Cl.
G06F 15/00 (2006.01)
G06F 13/00 (2006.01)
(52) U.S. Cl. .................................. 715/738; 715/854
(58) Field of Classification Search ................ 715/738, 715/745, 746–748, 751, 805, 854
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,038,561 A * | 3/2000 | Snyder et al. | 707/6 |
| 6,078,916 A | 6/2000 | Culliss | |
| 6,182,068 B1 | 1/2001 | Culliss | |
| 6,185,559 B1 | 2/2001 | Brin et al. | |
| 6,285,999 B1 | 9/2001 | Page | |
| 6,460,036 B1 * | 10/2002 | Herz | 707/10 |
| 6,526,440 B1 | 2/2003 | Bharat | |
| 6,529,903 B2 | 3/2003 | Smith et al. | |
| 6,598,054 B2 * | 7/2003 | Schuetze et al. | 707/103 R |
| 6,615,209 B1 | 9/2003 | Gomes et al. | |
| 6,658,423 B1 | 12/2003 | Pugh et al. | |
| 6,678,681 B1 | 1/2004 | Brin | |
| 6,725,259 B1 | 4/2004 | Bharat | |
| 6,754,873 B1 | 6/2004 | Law et al. | |
| 6,868,525 B1 * | 3/2005 | Szabo | 715/738 |
| 2002/0042791 A1 | 4/2002 | Smith et al. | |
| 2002/0059708 A1 | 5/2002 | Zhang et al. | |
| 2002/0069114 A1 | 6/2002 | Charette et al. | |
| 2002/0123988 A1 | 9/2002 | Dean et al. | |
| 2002/0133481 A1 | 9/2002 | Smith et al. | |
| 2004/0024752 A1 | 2/2004 | Manber et al. | |
| 2004/0119740 A1 | 6/2004 | Change et al. | |
| 2004/0122811 A1 | 6/2004 | Page | |
| 2004/0267725 A1 | 12/2004 | Harik et al. | |
| 2005/0065959 A1 | 3/2005 | Smith et al. | |
| 2005/0071224 A1 | 3/2005 | Fikes et al. | |
| 2005/0071741 A1 | 3/2005 | Acharya et al. | |
| 2005/0114198 A1 | 5/2005 | Koningstein et al. | |

OTHER PUBLICATIONS

Brin, Sergey et al., "The Anatomy of a Large-Scale Hypertextual Web Search Engine," 1998, Computer Science Department, Stanford University, Stanford, CA.

(Continued)

*Primary Examiner*—Cao (Kevin) Nguyen
(74) *Attorney, Agent, or Firm*—Fish & Richardson P.C.

(57) ABSTRACT

Systems and methods that identify manipulated articles are described. In one embodiment, a search engine implements a method comprising determining at least one cluster comprising a plurality of articles, analyzing signals to determine an overall signal for the cluster, and determining if the articles are manipulated articles based at least in part on the overall signal.

22 Claims, 2 Drawing Sheets

OTHER PUBLICATIONS

Bryan, Kurt and Leise, Tanya, "The $25,000,000,000★ Eigenvector The Linear Algebra Behind Google," Society for Industrial and Applied Mathematics. vol. 48,No. 3,pp. 569-581, 13 pages.

Dourisbourne, et al. "Extraction and Classification of Dense Communities in the Web," WWW 2007, May 8-12, 2007, Banff, Alberta Canada, 10 pages.

Fetterly, et al., "Spam, Damn Spam, and Statistics," Seventh Int'l Workshop on the Web and Databases, (WebDB 2004) Jun. 17-18, 2004, Paris, France. 6 pages.

Gibson, et al., "Discovering Large Dense Subparagraphs in Massive Graphs," Proceedings of the 31st VLDB Conference, Trondheim, Norway, 2005, 12 pages.

Henzinger, et al., "Challenges in Web Search Engines," Oct. 17, 2002, 14 pages.

Wikipedia—Bipartite Graph, [online] [retrieved May 15, 2007] Retrieved from http://en.wikipedia.org/w/index.php?title=Bipartite_graph&printable=yes , 3 pages.

Wikipedia—Link Farm, [online] [retrieved May 15, 2007] Retrieved from http://en.wikipedia.org/w/index.php?title=Link_farm&printable=yes , 3 pages.

Wikipedia—Spamdexing, [online] [retrieved May 15, 2007] Retrieved from http://en.wikipedia.org/w/index.php?title=Spamdexing&printable=yes , 5 pages.

* cited by examiner

METHODS AND SYSTEMS FOR IDENTIFYING MANIPULATED ARTICLES

FIELD OF THE INVENTION

The invention generally relates to manipulated articles. More particularly, the invention relates to methods and systems for identifying manipulated articles.

BACKGROUND OF THE INVENTION

A search engine or search engine program is a widely used mechanism for allowing users to search vast numbers of documents for information. Automated search engines locate websites by matching terms from a user entered search query to an indexed corpus of web pages. A conventional network search engine, such as the Google™ search engine, returns a result set in response to the search query submitted by the user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures, such as, the number of times the search terms appear in the document and the number of documents that contain a link to a document. A search result set comprising a ranked list of documents with a link to each document can be returned to the user.

Publishers or authors of a document, such as a web page or a dynamically generated web page, can use a variety of techniques to manipulate the document to increase the ranking of the document by a search engine. Given a high ranking, a user is more likely to click on the manipulated document from the search results. Manipulation techniques that can, for example, be used are: using the domain name of a once legitimate document; filling the text of the document or anchor text associated with links in the document with certain popular query terms; automatically creating links from other documents to the manipulated document; and presenting a different document to the web crawler than to the users. These manipulated documents can be referred to as spam. When a user receives a manipulated document in the search results and clicks on the link to go to the manipulated document, the document is very often an advertisement for goods or services unrelated to the search query or a pornography website or the manipulated document automatically forwards the user on to a website unrelated to the user's query. A user's search experience can be degraded if the search engine returns a search results set containing manipulated documents.

Manually determining whether documents are manipulated is extremely time intensive. Conventional methods exist for automatically identifying signals indicating a manipulated document. These conventional methods are performed on a document by document basis and often the signals for an individual document can be too weak to give a strong signal indicating that the document is manipulated.

Thus, a need exists to identify manipulated documents to prevent them from being in search results or lower the ranking of manipulated documents in search results.

SUMMARY

Embodiments of the present invention comprise methods and systems for identifying manipulated articles. In one embodiment, a search engine implements a method comprising determining at least one cluster comprising a plurality of articles, analyzing signals to determine an overall signal for the cluster, and determining if the articles are manipulated articles based at least in part on the overall signal. Additional aspects of the present invention are directed to computer systems and to computer-readable media having features relating to the foregoing aspects.

Further details and advantages of embodiments of the present invention are set forth below.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
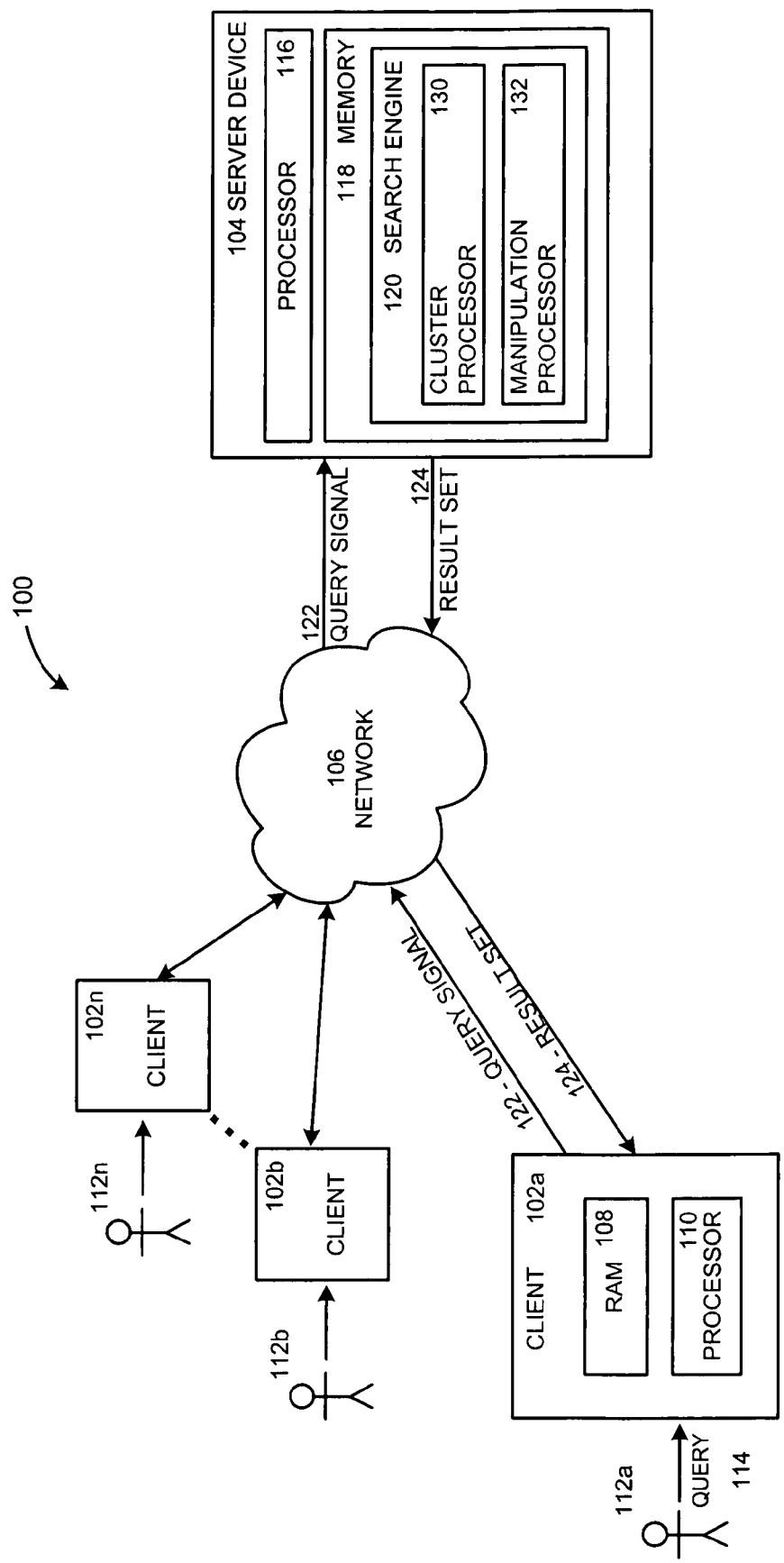
FIG. 1 is a diagram illustrating an exemplary environment in which one embodiment of the present invention may operate.

The present invention comprises methods and systems for identifying manipulated articles. Referring now to the drawings in which like numerals indicate like elements throughout the several figures, FIG. 1 is a block diagram illustrating an exemplary environment for implementation of an embodiment of the present invention. The system 100 shown in FIG. 1 includes multiple client devices 102$a$-$n$ in communication with a server device 104 over a network 106. The network 106 shown includes the Internet. In other embodiments, other networks, such as an intranet may be used. Moreover, methods according to the present invention may operate within a single computer.

The client devices 102$a$-$n$ shown each includes a computer-readable medium, such as a random access memory (RAM) 108 coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102$a$, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. In the embodiment shown, a user 112a-n generates a search query 114 at a client device 102a. The client device 102a transmits the query 114 to the server device 104 via the network 106. For example, a user 112a types a textual search query into a query field of a web page of a search engine interface or other client-side software displayed on the client device 102a, which is then transmitted via the network 106 to the server device 104. In the embodiment shown, a user 112a inputs a search query 114 at a client device 102a, which transmits an associated search query signal 122 reflecting the search query 114 to the server device 104. The search query 114 may be transmitted directly to the server device 104 as shown. In another embodiment, the query signal 122 may instead be sent to a proxy server (not shown), which then transmits the query signal 122 to server device 104. Other configurations are possible.

The server device 104 shown includes a server executing a search engine application program, such as the Google™ search engine. Similar to the client devices 102a-n, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant articles in response to a search query 114 from a user 112a-n. The search engine 120 then provides the result set 124 to the client 102a via the network 106. The result set 124 can include a ranked list of articles, such as web pages, and a link to each article. The search engine also comprises a cluster processor 130 and a manipulation processor 132. In the embodiment shown, each comprises computer code residing in memory 118.

In the embodiment shown, the server device 104, or related device, performs a crawl of the network 106 to locate articles, such as web pages, stored at other devices or systems connected to the network 106, and indexes the articles in memory 118 or on another data storage device prior to receiving and processing a search query 114. Articles include, for example, web pages, including dynamically generated web pages, of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

During or after the crawl of the network, the cluster processor 130 can identify clusters of potential manipulated documents. Such manipulated documents are documents that the publisher or author has manipulated to increase the ranking of the documents in search results and can be referred to as spam. The manipulation processor 132 can analyze signals from the cluster and the documents in the cluster to determine an overall signal. The overall signal can represent the probability that the documents in the cluster are manipulated. If the manipulation processor 132 determines that the documents in the cluster are likely to be manipulated or are manipulated, then the manipulation processor 132 can associate a manipulation indicator with each document in the cluster. Other functions and characteristics of the cluster processor 130 and manipulation processor 132 are further described below.

It should be noted that the present invention may comprise systems having a different architecture than that which is shown in FIG. 1. For example, in some systems according to the present invention, server device 104 may comprise a single physical or logical server, and the cluster processor 130 and manipulation processor 132 may be located external to the search engine 120. The system 100 shown in FIG. 1 is merely exemplary, and is used to explain the exemplary methods shown in FIG. 2.

Various methods in accordance with the present invention may be carried out. For example, in one embodiment at least one cluster is determined. The cluster contains a plurality of articles, such as web pages. Signals, such as manipulation signals indicating that an article or articles in the cluster are manipulated, are used to determine an overall signal for the cluster. The signals can comprise outside signals and document signals. Outside signals can be signals associated with the cluster, but not from the individual documents in the cluster and document signals can be signals from the documents in the cluster. In one embodiment, the overall signal is determined for a subset of articles in the cluster.

The overall signal is used at least partly to determine if the articles are manipulated. The overall signal can represent to what grade the page is considered to be manipulated or it can be used together with a threshold to determine whether the article is manipulated. The overall signal can be used at least in part in a ranking of an article in the cluster in response to a search query.

In one embodiment, a cluster is determined by computing a dense bipartite subgraph of articles comprising doorway articles and target articles, wherein the doorway articles contain links to the target articles. In one embodiment, a cluster is determined at least in part by identifying all of the documents on a host, where the host is likely to contain manipulated articles.

Figure 2:
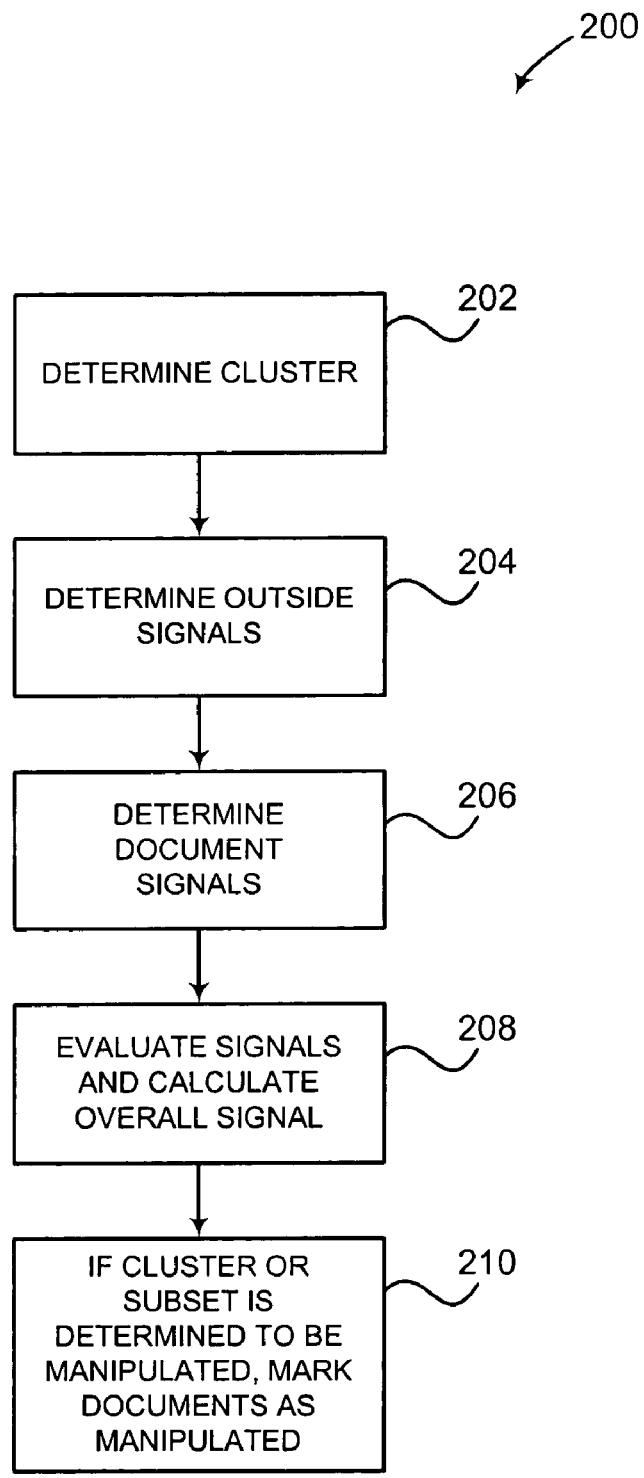
FIG. 2 is a flow diagram of a method of identifying manipulated documents in one embodiment of the present invention.

FIG. 2 illustrates an exemplary method 200 that provides a method for identifying manipulated documents. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, clusters of documents are determined by the cluster processor 130. Each cluster can be determined so that the documents that make up the cluster are likely to be manipulated documents. There are a variety of ways to determine potential manipulated clusters. In one embodiment, clusters of documents are created using dense bipartite subgraphs. These subgraphs are formed based on the hyperlink structure of the web. For example, dense bipartite subgraphs of the web can be created having two sets of nodes with one set containing doorway documents and one set containing target documents. Doorway documents are documents having links to the target documents and target documents are documents linked to by the doorway documents. In one embodiment, there are no links within the set of doorway documents and no links within the set of target documents. Each dense bipartite subgraph forms a cluster. Additionally, the cluster processor 130 can require that documents on the same host be part of the same cluster. The cluster processor 130 can combine clusters of documents on different hosts based on the dense bipartite subgraphs formed. For example, if a dense bipartite subgraph contained target documents from three hosts, a cluster containing all documents from the three hosts can be created.

Other methods for determining clusters can be used. For example, clusters can be formed by performing a search for manipulated documents and forming a cluster based on the search result set. Clusters can be formed from a certain part of the web if it is known that that portion of the web is likely to contain manipulated documents. Clusters can be formed from documents contained on a particular host, if it is known that the host is likely to contain manipulated documents. Clusters can be formed from documents on a group of hosts deemed affiliated if it is believed that the group of hosts are likely to contain manipulated documents.

In 204, the manipulation processor 132 analyzes the cluster to determine if there are any outside signals. An outside signal is a signal associated with the cluster, but not necessarily from an individual document, that indicates that the cluster may be manipulated. For example, when a dense bipartite subgraph is used, if there are a high number of guest book documents in the doorway documents this can be used as an outside signal. A guest book document is typically on a legitimate website and it allows visitors to write text and place a hyperlink to a document. A document publisher or author can automatically place hyperlinks to its document by placing hyperlinks in a large number of guest books. Therefore, if there is a high number of guest book documents in the doorway documents and there are some target documents with many in-links from guest book documents, then this can be a signal that these target documents can be a manipulated cluster. In this case, the whole bipartite cluster may not be a manipulated cluster, but rather only the subset of target documents with many in-links from guest book documents. Additionally, known manipulated documents contained on a host can be a signal that a cluster formed from the documents on the host is a manipulated cluster. A variety of other outside signals can also be determined.

In 206, individual document signals are determined by the manipulation processor 132. In one embodiment, document signals are determined automatically for all of the documents in the cluster. Alternatively, only a subset of documents in the cluster are evaluated for document signals. Document signals indicate that the document may be manipulated.

Any one or a variety of document signals may be used by various embodiments of the invention. Examples of document signals include, without limitation, one or more of the following:

The text of the document—whether the text appears to be normal English (or other language) text or text generated by a computer, such as containing a large number of keywords and not containing any sentences;

Meta tags—whether the document has meta tags and whether the meta tags contain a large number of repeated keywords;

Redirect—whether there is any script in the document such as JavaScript or HTML script that redirects a user to another document upon access; Similarly colored text and background—whether there is a large amount of text in the document that is the same color as the background of the document (Systems and methods for detecting hidden text and links in articles are described in U.S. patent application Ser. No. 10/726,483, filed Dec. 4, 2003, which is hereby incorporated by this reference);

A large number of random links—whether the document contains a large number of unrelated links;

History of the document—whether the text of the document, the link structure of the document, or the ownership of the website on which the document appears has changed recently (Systems and methods for using historical information in information retrieval are described in U.S. patent application Ser. No. 60/507,617, filed Sep. 30, 2003, which is hereby incorporated by this reference);

Anchor text—whether there are a lot of links on the page and there is little or no text that is not anchor text.

In 208, the manipulation processor 132 evaluates the signals (the outside signals and the document signals) and can determine an overall signal for each cluster. This can be done in a variety of ways using a variety of rules and signals. For example, the manipulation processor 132 can determine the percentage of documents within the cluster that contain a certain document signal, such as, for example, the percentage of documents that only contain text that is anchor text, the percentage of documents that have meta tags, and the percentage of documents that cause a redirect. The manipulation processor 132 can also determine if documents have a combination of signals, such as, for example, whether a document's ownership has recently changed in combination with whether the document's out link structure has recently changed.

These rules can be designed manually to determine whether all documents in the cluster or a subset of documents in the cluster are manipulated. Alternatively, a machine learning approach can be used to define the rules. With the machine learning approach, a set of clusters, know as a training set, can be hand classified as manipulated or not manipulated. This information is provided to a classification system to train the system and allow the system to compute which signals to use and in what way. The classification system can be trained by, for example, using a neural nets or a boosting approach. After being trained and receiving a new cluster with the associated signals, the classification system can be used to classify the documents in the cluster or a subset of documents in the cluster as manipulated or not manipulated. Alternatively, the classification system can output a score for the cluster or for each document in the cluster indicating the cluster's or document's degree of manipulation.

In 210, if it is determined that the cluster or a subset of documents in the cluster is manipulated, then each document in the cluster or subset is marked as manipulated. In one embodiment, the overall signal can be a representation of the probability or degree that the cluster or subset is manipulated. If the overall signal is above a first threshold, then the cluster can be manually checked for manipulation. If the overall signal is above a second threshold, all of the documents in cluster or subset can be declared manipulated. When it is manually determined that the cluster contains manipulated documents or when the overall signal is above a second threshold, the documents can be marked as manipulated with a manipulation indicator associated with each document. Alternatively, the overall signal can indicate that the cluster does contain manipulated documents and the documents can be so marked with a manipulation indicator. The manipulation indicator can be an absolute value, indicating that the document is manipulated, or can represent the probability or degree that the document is manipulated.

A manipulation indicator can be associated with every document in a cluster or subset of the cluster determined to be manipulated. This manipulation indicator can then be used during the retrieval and ranking phase by the search engine 120 in a variety of ways. For example, a manipulation indicator can be used in a ranking function to lower the rank of a document. Alternatively, a manipulation indicator can be used as an indication that the document should be removed entirely from the search results. Additionally, a manipulation indicator can be used to treat the document differently, such as not using the document in a hyperlink structure-based ranking calculation, such as PageRank™ from Google, Inc. Further, a manipulation indicator can be used depending on the query. For example, if the query relates to pornography, the manipulation indicator may not be used. Manipulated indicators can be used in a variety of other ways during the retrieval and ranking processes.

By clustering documents to generate an overall signal, all signals for all documents are not required. Therefore, some manipulated documents might have no signal apart from falling into the manipulated cluster and would, thus, be caught by using the clustering approach. The overall signal can be much stronger than individual signals from the documents in a cluster, if, for example, all or many of the documents in the cluster have a particular signal. Additionally, new signals can be created by clustering documents, such as looking at the percentage of documents with a particular signal.

While the above description contains many specifics, these specifics should not be construed as limitations on the scope of the invention, but merely as exemplifications of the disclosed embodiments. Those skilled in the art will envision many other possible variations that are within the scope of the invention.

That which is claimed:

1. A method, comprising:
   determining at least one cluster comprising a plurality of articles;
   analyzing signals associated with one or more articles in the plurality of articles to determine an overall signal for the cluster; and
   determining if articles in the plurality of articles are manipulated articles based at least in part on the overall signal;
   wherein determining the at least one cluster comprises computing a dense bipartite subgraph of articles comprising doorway articles and target articles, wherein the doorway articles contain links to the target articles.

2. The method of claim 1, wherein determining the at least one cluster comprises identifying all of the documents on a host.

3. The method of claim 2, wherein the host is likely to contain manipulated articles.

4. The method of claim 1, wherein the overall signal represents a likelihood that the articles are manipulated articles.

5. The method of claim 1, wherein the overall signal is compared to a threshold to determine whether the articles are manipulated articles.

6. The method of claim 1, wherein the overall signal is used at least in part in ranking an article in response to a search query.

7. The method of claim 1, wherein the signal comprises at least one of outside signals and document signals.

8. A computer-implemented method comprising:
   forming a cluster of documents from a plurality of network-accessible documents by identifying a dense bipartite subgraph from the plurality of network-accessible documents, the dense bipartite subgraph comprising a first set of doorway documents and a second set of target documents, wherein doorway documents in the first set have links to target documents in the second set;
   analyzing a plurality of documents in the cluster of documents to determine an overall value for the cluster; and
   when the overall value is greater than a threshold value, marking at least one of the documents in the cluster as a manipulated article.

9. The computer-implemented method of claim 8, wherein marking the at least one document as a manipulated article comprises identifying the at least one document as a document that has been manipulated to increase the document's ranking by a search engine.

10. The computer-implemented method of claim 8, wherein marking the at least one document comprises preventing the at least one document from being included in a search result set provided by a search engine in response to a search query.

11. The computer-implemented method of claim 8, further comprising marking each document in the cluster as a manipulated article.

12. The computer-implemented method of claim 8, wherein forming the cluster of documents further comprises including documents in the cluster that are stored on a host that stores other documents included in the dense bipartite subgraph.

13. The computer-implemented method of claim 8, further comprising marking as manipulated articles other documents that are stored on a host that stores the at least one document in the cluster.

14. The computer-implemented method of claim 8, wherein analyzing a plurality of documents in the cluster of documents comprises determining if a target document in the cluster of documents has more than a threshold number of links to guestbook documents that are included in the doorway documents.

15. The computer-implemented method of claim 8, wherein analyzing a plurality of documents in the cluster of documents comprises determining if more than a threshold number of the plurality of documents in the cluster of documents each has an individual document signal that indicates that the document is likely to be a manipulated article.

16. The computer-implemented method of claim 15, wherein the individual document signal is an indication that the corresponding document has a large number of keywords without a proportional number of sentences.

17. The computer-implemented method of claim 15, wherein the individual document signal is an indication that the corresponding document includes meta tags having a large number of repeated keywords.

18. The computer-implemented method of claim 15, wherein the individual document signal is an indication that the corresponding document includes a script configured to redirect a user upon access of the corresponding document.

19. The computer-implemented method of claim 15, wherein the individual document signal is an indication that the corresponding document includes more than a threshold amount of text having the same color as a background color of the corresponding document.

20. The computer-implemented method of claim 15, wherein the individual document signal is an indication that the corresponding document includes more than a threshold number of unrelated links.

21. The computer-implemented method of claim 15, wherein the individual document signal is an indication that a link structure of the corresponding document has recently changed or that ownership of a web site with which the corresponding document is associated has recently changed.

22. The computer-implemented method of claim 15, wherein the individual document signal is an indication that the corresponding document includes more than a threshold number of links that lack corresponding anchor text.

* * * * *